(12) United States Patent
Iwamoto et al.

(10) Patent No.: US 6,741,073 B2
(45) Date of Patent: May 25, 2004

(54) BEARING PROVIDED WITH ROTATION SENSOR AND MOTOR EMPLOYING THE SAME

(75) Inventors: Kenichi Iwamoto, Iwata (JP); Takashi Koike, Iwata (JP); Yoshitaka Nagano, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/911,737

(22) Filed: Jul. 25, 2001

(65) Prior Publication Data

US 2002/0030482 A1 Mar. 14, 2002

(30) Foreign Application Priority Data

| Jul. 26, 2000 | (JP) | 2000-225207 |
| Jul. 31, 2000 | (JP) | 2000-230365 |
| Aug. 1, 2000 | (JP) | 2000-233218 |
| Dec. 6, 2000 | (JP) | 2000-371030 |
| Dec. 11, 2000 | (JP) | 2000-375513 |

(51) Int. Cl.$^7$ .................. G01P 3/481; F16C 19/00
(52) U.S. Cl. ............... 324/174; 324/207.12; 384/448
(58) Field of Search .................. 324/174, 207.25, 324/207.12, 207.15; 384/448

(56) References Cited

U.S. PATENT DOCUMENTS 5,530,344 A * 6/1996 Caillaut et al. ............. 324/174

* cited by examiner

*Primary Examiner*—Walter E. Snow
(74) *Attorney, Agent, or Firm*—McDermott, Will & Emery

(57) ABSTRACT

A bearing provided with a rotation sensor comprises an outer ring, an inner ring and rolling elements, and a magnetic ring is engaged with the inner diametral surface of the outer ring. Thus, a highly reliable bearing provided with a rotation sensor exerting no bad influence on a magnetic sensor can be provided.

8 Claims, 19 Drawing Sheets

FLUCTUATION OF
MAGNETIZATION
INTENSITY(%)

$\mu = 4.75\%$
$3\sigma = 4.17\%$

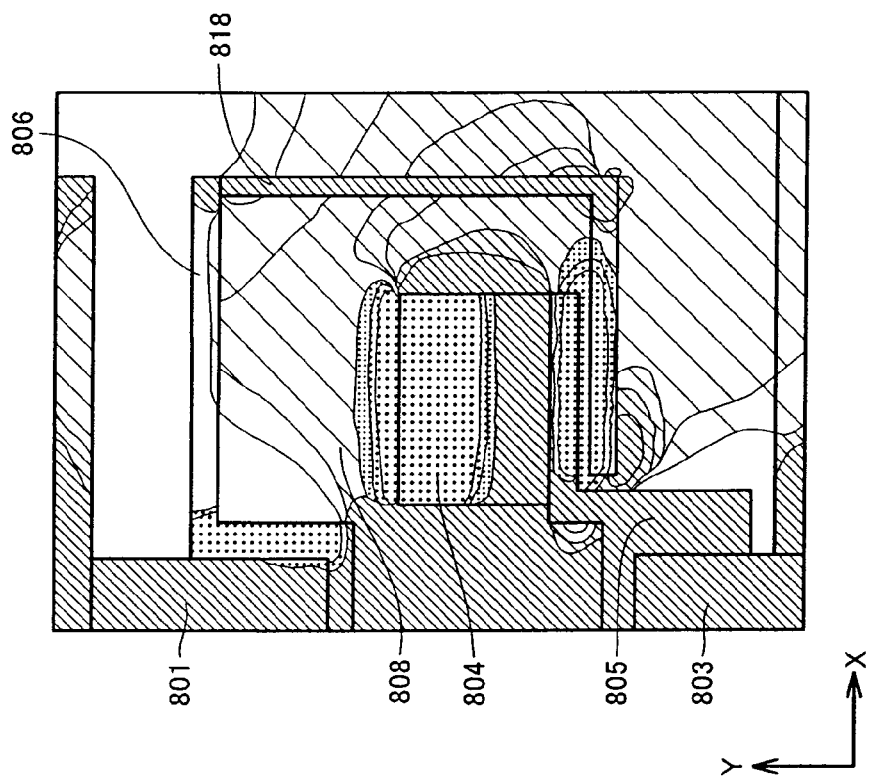
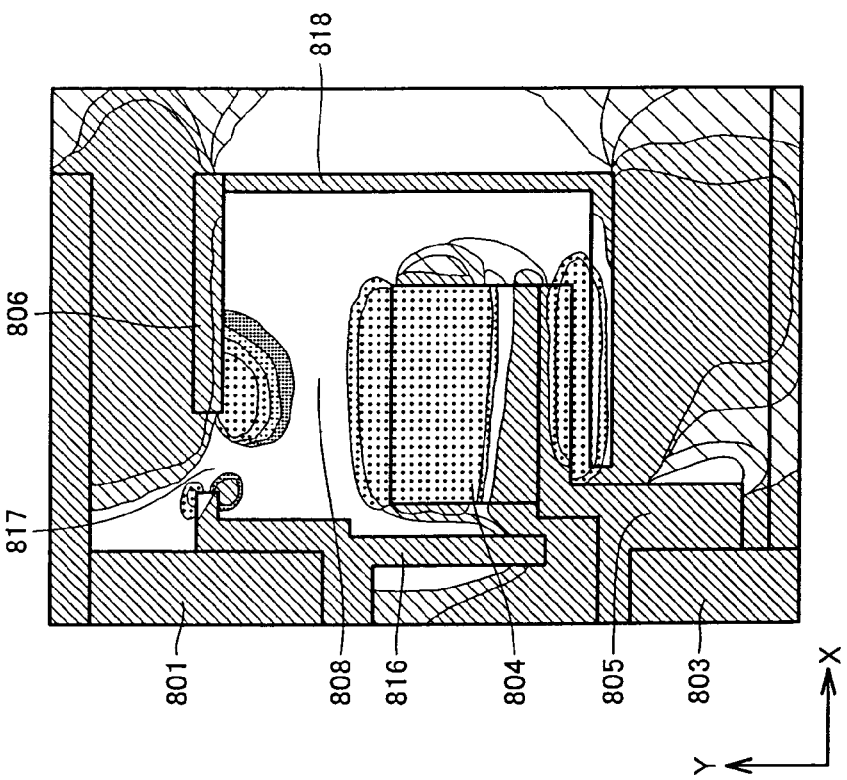
FIG.23A
FIG.23B

BEARING PROVIDED WITH ROTATION SENSOR AND MOTOR EMPLOYING THE SAME

BACKGROUND OF THE INVENTION

1. Field of the Invention

The present invention relates to a bearing provided with a rotation sensor, and more specifically, it relates to the structure of a bearing employed for a general-purpose motor requiring a rotation detecting function.

The present invention also relates to a bearing provided with a rotation sensor, and more specifically, it relates to a method of extracting a signal from a bearing provided with a rotation sensor.

The present invention further relates to a bearing provided with a rotation sensor, and more specifically, it relates to a bearing provided with a rotation sensor having a function of detecting the number of rotations or a rotational direction.

The present invention further relates to a bearing provided with a rotation sensor and a motor employing the same, and more specifically, it relates to a bearing provided with a rotation sensor supporting a shaft requiring a rotation detecting function. More particularly, the present invention relates to a bearing provided with a rotation sensor used in the vicinity of a general-purpose motor or the like generating a large magnetic field.

2. Description of the Prior Art

First Prior Art

The structure of a bearing 500 provided with a rotation sensor according to first prior art is described with reference to FIG. 26. FIG. 26 is a sectional view showing the structure of the bearing 500 provided with a rotation sensor. This bearing 500 provided with a rotation sensor, forming an antifriction bearing, comprises an outer ring 1, an inner ring 3 and rolling elements 2. A shielding member is provided between the outer ring 1 and the inner ring 3.

When the inner ring 3 is employed as a rotating bearing ring, a pulser ring 4 is fixed to the inner ring 3 with a mandrel 5. When the outer ring 1 is employed as a fixed bearing ring, a magnetic sensor 8 is fixed to the outer ring 1 with a sensor case 7 and a sensor case fixing ring 6. The bearing 500 provided with a rotation sensor having the aforementioned structure, which is compact and strong with no requirement for assembly control, is applied to a support bearing for the rotary shaft of a motor.

Problem of First Prior Art

FIG. 27 shows the bearing 500 provided with a rotation sensor having the aforementioned structure in a state assembled into a motor. FIG. 27 is a sectional view showing the structure of the motor into which the bearing 500 provided with a rotation sensor is assembled. A motor rotor 11 assembled into a rotary shaft 12 is supported in a housing 13 by a front bearing 14 and a rear bearing 15, and a motor stator 10 is also fixed to the housing 13. In the motor shown in FIG. 27, the rear bearing 15 stores a rotation sensor.

When a large current is fed to the motor stator 10, the flow of a magnetic flux cannot be ignored. A magnetic loop is generated to pass through the motor rotor 11, the rotary shaft 12, the inner ring 3, the outer ring 1 and the housing 13 and return to the motor stator 10 as shown by arrows in FIG. 27. At this time, a nonmagnetic part occupies most part of the space between the inner ring 3 and the outer ring 1, except the rolling elements 2. The magnetic rolling elements 2 are in point contact with the inner ring 3 and the outer ring 1, and arranged only on about six portions of a circumference. Therefore, a path through the inner ring 3, the rolling elements 2 and the outer ring 1 has high magnetic resistance.

Consequently, the bearing 15 exhibits high magnetic resistance, readily leading to leakage of a magnetic flux. The leaking magnetic flux flows to the sensor case fixing ring 6 and the mandrel 5, which are magnetic members, to disadvantageously exert bad influence on the magnetic sensor 8 and disturb a sensor signal.

Second Prior Art

Another type of bearing provided with a rotation sensor has a rotating element provided with a sensor target such as a magnetic pattern and a fixed element provided with a sensor element for detecting relative rotational movement of the sensor target with respect to the sensor element and outputting an electric signal.

FIGS. 28 and 29 show the sectional structures of bearings 600a and 600b provided with rotation sensors according to second prior art. Each of the bearings 600a and 600b provided with rotation sensors has an inner ring 601, an outer ring 603 and rolling elements 602 provided in an annular space defined between the inner ring 601 and the outer ring 603. When the inner ring 601 is employed as a rotating element, an encoder ring 604 serving as a sensor target is fixed to the inner ring 601. When the outer ring 603 is employed as a non-rotating element, a rotation detecting sensor 605 detecting rotation of the encoder ring 604 is fixed to the outer ring 603.

Problem of Second Prior Art

In order to extract an output signal from the rotation detecting sensor 605, a cable must be extracted from a circuit board into which the rotation detecting sensor 605 is assembled. When the outer diameter of the bearing 600a or 600b is larger than 30 mm, a cable 610 can be extracted from an axial end surface of the bearing 600a provided with a rotation sensor as shown in FIG. 28 or from the outer peripheral surface of the bearing 600b provided with a rotation sensor as shown in FIG. 29.

If the outer diameter of the bearing 600a or 600b is smaller than 30 mm, however, no space for extracting the cable 610 is defined but it is difficult to extract a signal from the rotation detecting sensor 605.

Third Prior Art

FIG. 30 is a sectional view showing a bearing provided with a rotation sensor according to third prior art. Referring to FIG. 30, this bearing provided with a rotation sensor is an antifriction bearing formed by an outer ring 701, an inner ring 703 and rolling elements 702, and a pulser ring 704 is fixed to the rotating element (the inner ring 703, for example) while a magnetic sensor 705 is fixed to the non-rotating element (the outer ring 701, for example) through a sensor case 706. A magnetic encoder is formed on the surface of the pulser ring 704. Such a bearing provided with a rotation sensor, which is miniature and strong with no requirement for assembly control, is utilized for supporting a motor or the like.

Alternatively, the outer ring 701 and the inner ring 703 may be employed as a rotating element and a non-rotating element respectively.

The sensor of such a bearing provided with a rotation sensor generates an analog output shown in FIG. 31A or a rectangular wave output shown in FIG. 31B. An analog output type sensor must have repetitive reproducibility of a sinusoidal waveform, and hence uniformity of magnetization intensity is important for the magnetic encoder. A rectangular wave output type sensor utilizes an output signal in a saturated waveform, and hence large magnetization intensity is more strongly required as compared with uniformity of the magnetization intensity. When the magnetization intensity is large, magnetic field strength steeply changes to advantageously improve pitch accuracy or increase a sensor gap.

Problem of Third Prior Art

In general, anisotropic magnetic powder is employed for the magnetic encoder regardless of the output signal. When anisotropic magnetic powder is employed for an analog output type encoder, however, the amplitude of a sinusoidal wave output is disadvantageously largely dispersed.

Fourth Prior Art

FIG. 32 is a longitudinal sectional view of a bearing provided with a rotation sensor according to fourth prior art. Referring to FIG. 32, the bearing provided with a rotation sensor is an antifriction bearing formed by an outer ring 801, an inner ring 803 and rolling elements 802, and a pulser ring 804 is fixed to a rotating side (the side of the inner ring 803, for example) through a mandrel 805 while a magnetic sensor 808 is fixed to a non-rotating side (the side of the outer ring 801, for example) through a sensor case 807 and a sensor case fixing ring 806. Such a bearing provided with a rotation sensor, which is miniature and strong with no requirement for assembly control, is employed as a bearing for supporting a motor or the like.

Problem of Fourth Prior Art

When the bearing provided with a rotation sensor shown in FIG. 32 is assembled into the magnetic path of a coil or a magnet generating a large magnetic field, however, an output of the bearing provided with a rotation sensor may malfunction by a leakage flux caused by the external magnetic field.

FIG. 33 shows the bearing provided with a rotation sensor assembled into a motor, for example. Referring to FIG. 33, a front bearing 814 and a rear bearing 815 provided with a rotation sensor support a motor rotor 811 assembled into a rotary shaft 812 in a housing 813, to which a motor stator 810 is fixed. When a large current is fed to the motor stator 810, the flow of a magnetic flux cannot be ignored but a magnetic loop is generated to pass through the motor rotor 811, the rotary shaft 812, the inner ring 803, the outer ring 801 and the housing 813 and return to the motor stator 810 as shown by arrows in FIG. 33.

When the direction of the current is reversed, the magnetic loop is also reversed. At this time, a nonmagnetic part dominantly occupies the space between the inner ring 803 and the outer ring 801 except the rolling elements 802 and a retainer 819 and to increase magnetic resistance, and hence a magnetic flux readily leaks to influence the magnetic sensor 808 and disturb a sensor signal or cause a malfunction.

SUMMARY OF THE INVENTION

A first object of the present invention is to provide a highly reliable bearing provided with a rotation sensor exerting no bad influence on a magnetic sensor, in order to solve the aforementioned problem of the first prior art.

A second object of the present invention is to provide a bearing provided with a rotation sensor capable of readily extracting a signal from a rotation detecting sensor also when the outer diameter thereof is smaller than 30 mm, in order to solve the aforementioned problem of the second prior art.

A third object of the present invention is to provide a bearing provided with a rotation sensor employing isotropic magnetic powder for an analog output to be capable of reducing dispersion of the amplitude of a sinusoidal wave output, in order to solve the aforementioned problem of the third prior art.

A fourth object of the present invention is to provide a bearing provided with a rotation sensor capable of cutting off a loop of a leakage flux flowing to a magnetic sensor and reducing influence on the magnetic sensor and a motor employing the same, in order to solve the aforementioned problem of the fourth prior art.

A bearing provided with a rotation sensor according to a first aspect of the present invention comprises an inner ring, an outer ring and a plurality of rolling elements stored between the aforementioned inner ring and the aforementioned outer ring and stores a sensor detecting the rotational speed of a rotor, and further includes a pulser ring mounted on a first end of a rotating bearing ring formed by either the aforementioned inner ring or the aforementioned outer ring, a sensor mounted on a first end of a fixed bearing ring formed by the remaining one of the aforementioned inner ring and the aforementioned outer ring on a position opposed to the aforementioned pulser ring and a magnetic ring mounted on second ends of the aforementioned inner ring and the aforementioned outer ring for forming a magnetic path between the aforementioned inner ring and the aforementioned outer ring.

In the bearing provided with a rotation sensor according to this aspect, leakage of a magnetic flux can be prevented in a bearing part by arranging a magnetic body between the outer ring and the inner ring and reducing magnetic resistance in the bearing part. Consequently, a magnetic sensor is prevented from bad influence exerted by leakage of the magnetic flux, and the bearing provided with a rotation sensor can be improved in reliability.

In the aforementioned aspect, the aforementioned magnetic ring is preferably a seal sealing an annular space defined between the aforementioned inner ring and the aforementioned outer ring. More preferably, the aforementioned seal is a rubber seal containing magnetic powder. According to this structure, the magnetic ring can be provided with a function of forming a magnetic path between the aforementioned inner ring and the aforementioned outer ring and a function of sealing the annular space defined between the aforementioned inner ring and the aforementioned outer ring.

In the aforementioned aspect, the aforementioned magnetic ring is preferably provided with an outwardly directed projection. Thus, when the bearing provided with a rotation sensor is applied to a bearing for the rotary shaft of a motor, a detent for the fixed bearing ring can be implemented by engaging the projection with a housing of the motor.

In the aforementioned aspect, the bearing provided with a rotation sensor preferably further comprises a sensor case holding the aforementioned sensor, a sensor case fixing ring fixing the aforementioned sensor ring and a mandrel holding the aforementioned pulser ring, and at least either the aforementioned sensor case fixing ring or the aforementioned mandrel is preferably a nonmagnetic member.

When at least either the sensor case fixing ring or the mandrel is formed by a nonmagnetic member as described above, the magnetic resistance of the magnetic sensor part can be so increased that no magnetic flux passes through the magnetic sensor part.

A motor according to the present invention comprises a housing, a stator fixed to the aforementioned housing and a rotor opposed to the aforementioned stator and fixed to a rotary shaft, and employs the bearing provided with a rotation sensor according to the first aspect for supporting the aforementioned rotary shaft.

When the bearing provided with a rotation sensor according to the first aspect of the present invention is employed for supporting the rotary shaft of the motor, a rotation signal of the motor can be correctly obtained.

A bearing provided with a rotation sensor according to a second aspect of the present invention comprises an inner ring, an outer ring and a plurality of rolling elements stored between the aforementioned inner ring and the aforementioned outer ring and stores a rotation detecting sensor detecting the rotational speed of a rotor, and further comprises an electric terminal for coming into contact with an externally provided connection terminal for supplying power to the aforementioned rotation detecting sensor and outputting an electric signal from the rotation detecting sensor.

Thus, no cable may be directly extracted from the bearing provided with a rotation sensor for outputting a signal from the rotation sensor. Consequently, the bearing provided with a rotation sensor can be miniaturized and a space for assembling the same into a housing of a motor or the like can be reduced.

In the aforementioned aspect, the outer diameter of the aforementioned outer ring is preferably not more than 30 mm. In the aforementioned aspect, the aforementioned electric terminal is preferably in the form of a pad. In the aforementioned aspect, the aforementioned electric terminal is preferably in the form of a pin. In the aforementioned aspect, the aforementioned rotation detecting sensor is preferably any of a magnetic sensor, an eddy current sensor or a photosensor.

In the aforementioned aspect, the aforementioned electric terminal is preferably provided on the outer peripheral surface of a sensor case for fixing the aforementioned rotation detecting sensor. In the aforementioned aspect, further, the aforementioned electric terminal is preferably provided on an axial end surface of a sensor case for fixing the aforementioned rotation detecting sensor.

Thus, no space is required for extracting a cable for outputting a signal but the bearing provided with a rotation sensor can be miniaturized and a space for assembling the same into a housing of a motor or the like can be reduced.

In the aforementioned aspect, the bearing provided with a rotation sensor is preferably provided with rotational direction positioning means for positioning the aforementioned connection terminal, which is externally provided, with respect to the aforementioned electric terminal along the rotational direction. In the aforementioned aspect, further, the bearing provided with a rotational sensor is preferably provided with axial direction positioning means for axially positioning the aforementioned connection terminal, which is externally provided, with respect to the aforementioned electric terminal.

Thus, an operation for assembling the bearing provided with a rotation sensor to a housing of a motor or the like can be improved in efficiency, and the electric terminal and the connection terminal can be readily connected with each other by simply assembling the bearing provided with a rotation sensor into the housing.

In the aforementioned aspect, the bearing provided with a rotation sensor preferably further includes at least one of a temperature sensor, a vibration sensor and a load sensor.

A bearing provided with a rotation sensor according to a third aspect of the present invention comprises an inner ring, an outer ring and a plurality of rolling elements stored between the inner ring and the outer ring and stores a sensor detecting the rotational speed of a rotor so that one of the inner ring and the outer ring forms a rotating bearing ring and the other one forms a fixed bearing ring, and further includes a pulser ring mounted on an end of the aforementioned rotating bearing ring and a sensor mounted on the aforementioned fixed bearing ring in opposition to the aforementioned pulser ring. The pulser ring is a magnetized encoder consisting of elastomer containing magnetic powder, and isotropic magnetic powder is employed when the sensor outputs an analog signal while anisotropic magnetic powder is employed when the sensor outputs a rectangular wave signal.

Thus, dispersion of magnetization intensity can be reduced, thereby reducing dispersion of the amplitude of the output from the sensor.

When the encoder outputs an analog signal, an MR element is employed as the sensor.

The magnetic powder is ferrite.

A bearing provided with a rotation sensor according to a fourth aspect of the present invention comprises an inner ring, an outer ring and a plurality of rolling elements stored between the inner ring and the outer ring and stores a sensor detecting the rotational speed of a rotor so that one of the inner ring and the outer ring forms a rotating bearing ring and the other one forms a fixed bearing ring, and further comprises a pulser ring mounted on an end of the rotating bearing ring, a sensor mounted on the fixed bearing ring in opposition to the pulser ring and a magnetic ring arranged between the rolling elements and the sensor in an annular space defined between the inner ring and the outer ring for forming a magnetic path.

Thus, influence exerted by a leakage flux on a magnetic sensor or the pulser ring can be minimized and the sensor can be prevented from disturbance of the waveform of its output or a malfunction, to be resistant against an external leakage flux.

An air gap between the magnetic ring and the rotating bearing ring is selected to be not more than 0.5 mm.

The bearing provided with a rotation sensor further comprises a sensor case holding the sensor, a sensor case fixing ring fixing the sensor case and a mandrel holding the pulser ring, and the sensor case fixing ring and the mandrel are formed by magnetic members.

A magnetic bypass reducing magnetic resistance is provided between the sensor case fixing ring and the rotating bearing ring.

The sensor case fixing ring is formed with a slit on the side of the fixed bearing ring on which the sensor case fixing ring is mounted and in the vicinity of the sensor.

The pulser ring is formed by a magnetized encoder consisting of elastomer containing magnetic powder.

The thickness of the elastomer in the magnetized encoder is at least 2 mm.

Another motor according the present invention comprises a housing, a stator fixed to the housing and a rotor opposed to the stator and fixed to a rotary shaft, and employs the bearing provided with a rotation sensor according to the fourth aspect.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 23A and 23B illustrate Y-directional magnetic flux distributions obtained by two-dimensional field analysis;

DESCRIPTION OF THE PREFERRED EMBODIMENTS

First Embodiment

The structure of a bearing 100a provided with a rotation sensor according to a first embodiment of the present invention is now described with reference to the drawings.

Structure

Figure 26:
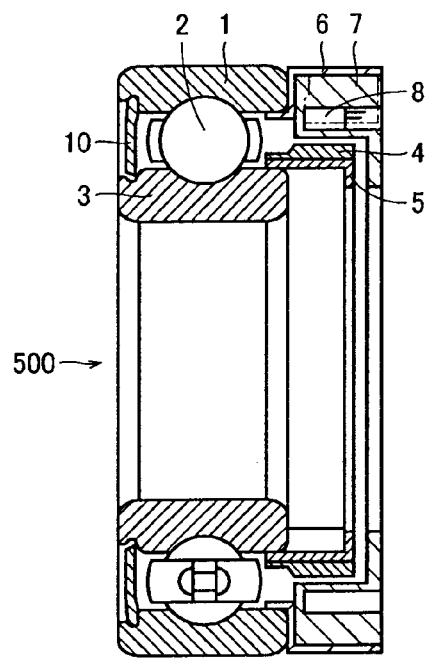
FIG. 26 is a sectional view showing the structure of a bearing 500 provided with a rotation sensor according to first prior art.

The basic structure of the bearing 100a provided with a rotation sensor according to this embodiment is similar to that of the conventional bearing 500 provided with a rotation sensor shown in FIG. 26. Therefore, parts of the former identical or corresponding to those of the latter are denoted by the same reference numerals, and redundant description is not repeated.

Figure 1:
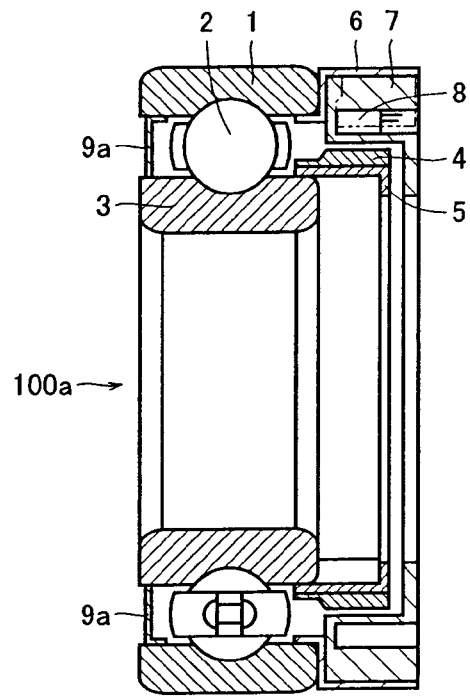
FIG. 1 is a sectional view showing the structure of a bearing 100a provided with a rotation sensor according to a first embodiment of the present invention.

The structure of the bearing 100a provided with a rotation sensor according to the first embodiment is described with reference to FIG. 1.

The bearing 100a provided with a rotation sensor according to the first embodiment is different from the conventional bearing 500 provided with a rotation sensor in a point that a magnetic ring 9a is engaged with the inner diametral surface of an outer ring 1. A gap of about 0.1 mm is defined between a side of the magnetic ring 9a closer to an inner ring 3 and the outer diametral surface of the inner ring 3.

Function/Effect

When the aforementioned magnetic ring 9a is provided, a magnetic flux from the inner ring 3 toward the outer ring 1 flows through the magnetic ring 9a having the minimum magnetic resistance. Thus, flux leakage in a bearing part is avoided so that no bad influence is exerted on a magnetic sensor 8 and a pulser ring 4. A sealing mechanism (a rubber member, a labyrinth structure or the like) is preferably added to the part of the magnetic ring 9a closer to the inner ring 3 for sealing an annular space defined between the inner ring 3 and the outer ring 1, and magnetic resistance of the bearing part can be further reduced when a sealing member forming the sealing mechanism is formed by a rubber seal containing magnetic powder.

In the bearing 100a provided with a rotation sensor according to this embodiment, either or both of a mandrel 5 and a sensor case fixing ring 6 are formed by nonmagnetic members. Thus, magnetic resistance is increased on the side of the magnetic sensor 8, so that no magnetic flux passes through the magnetic sensor part.

As to the materials for the mandrel 5, the sensor case fixing ring 6 and a sensor case 7, SUS303, SUS304 or the like is employed for the mandrel 5 and the sensor case fixing ring 6, while resin (PBT) or the like is employed for the sensor case 7. Further, magnetic rubber containing ferrite powder or the like is employed as the material for the pulser ring 4.

The magnetic resistance of the magnetic ring 9a is preferably about 1/10 that across the sensor case fixing ring 6 and the sensor case 7.

Modifications

Modifications of the aforementioned bearing 100a provided with a rotation sensor are now described with reference to FIGS. 2 to 4.

Figure 2:
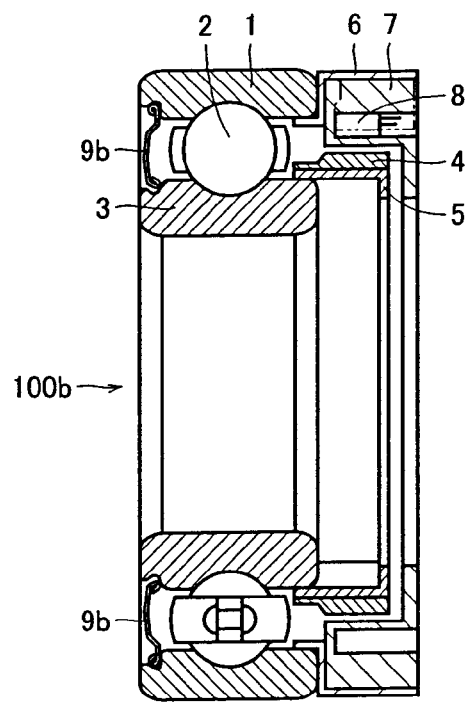
FIG. 2 is a sectional view showing the structure of a bearing 100b provided with a rotation sensor according to a modification of the bearing 100a provided with a rotation sensor according to the first embodiment.

A bearing 100b provided with a rotation sensor shown in FIG. 2 is provided with a shielding plate 9b, which is made of a magnetic substance itself. This bearing 100b provided with a rotation sensor can attain a function/effect similar to that of the aforementioned bearing 100a provided with a rotation sensor.

Figure 3:
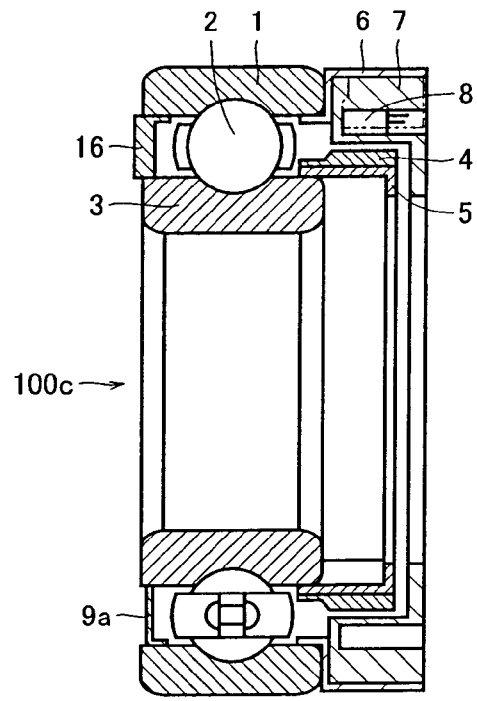
FIG. 3 is a sectional view showing the structure of a bearing 100c provided with a rotation sensor according to another modification of the bearing 100a provided with a rotation sensor according to the first embodiment.
Figure 4:
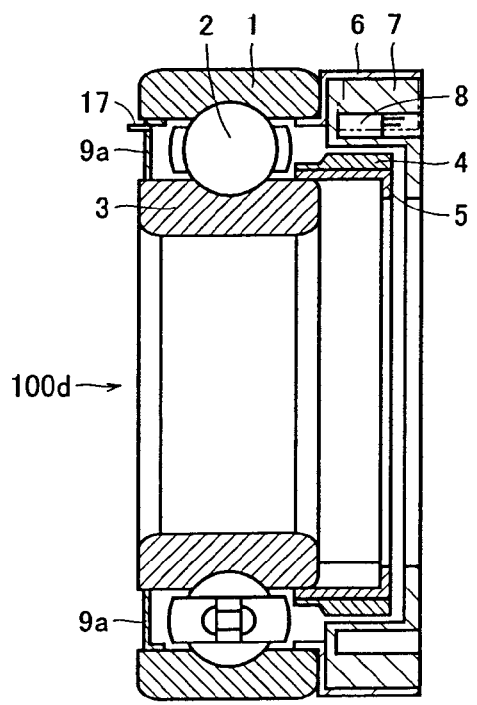
FIG. 4 is a sectional view showing the structure of a bearing 100d provided with a rotation sensor according to still another modification of the bearing 100a provided with a rotation sensor according to the first embodiment.
Figure 5:
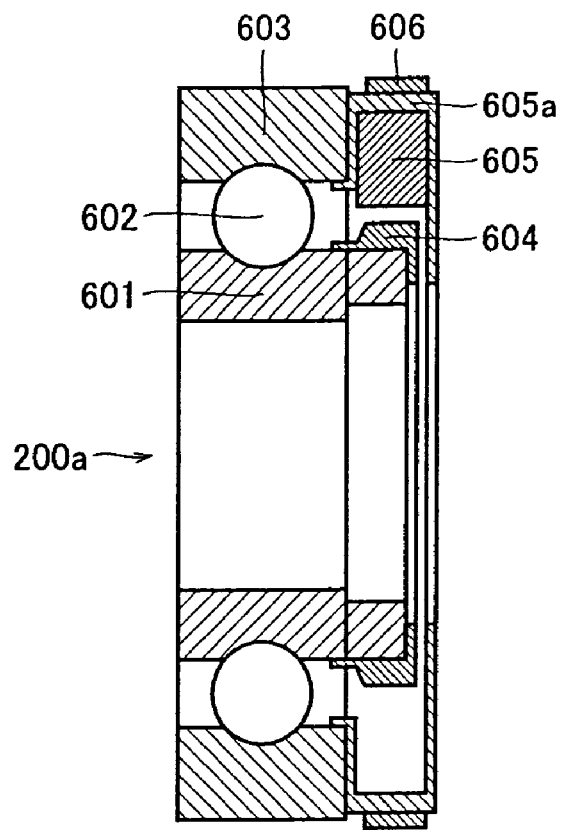
FIG. 5 is a longitudinal sectional view showing the structure of a bearing 200a provided with a rotation sensor according to a second embodiment of the present invention.
Figure 6:
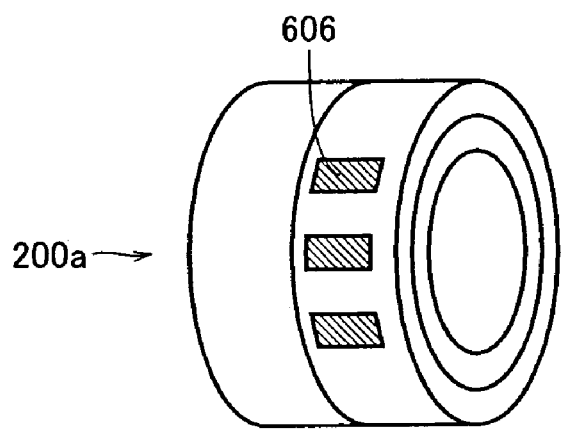
FIG. 6 is a total perspective view of the bearing 200a provided with a rotation sensor according to the second embodiment.
Figure 7:
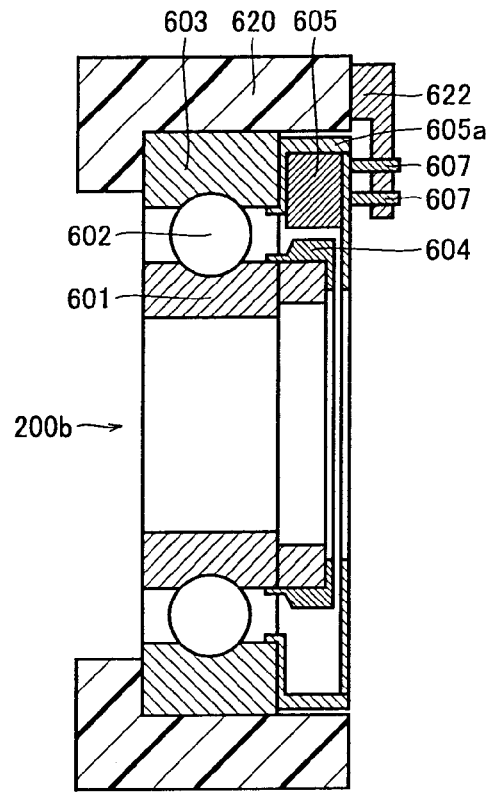
FIG. 7 is a longitudinal sectional view showing the structure of a bearing 200b provided with a rotation sensor according to a modification of the second embodiment.
Figure 8:
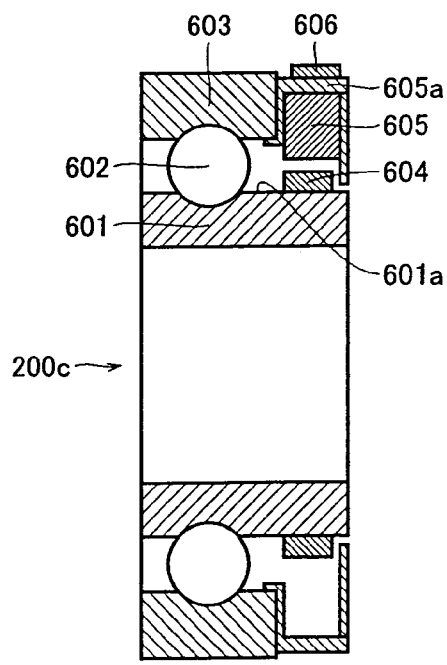
FIG. 8 is a longitudinal sectional view showing the structure of a bearing 200c provided with a rotation sensor according to another modification of the second embodiment.
Figure 27:
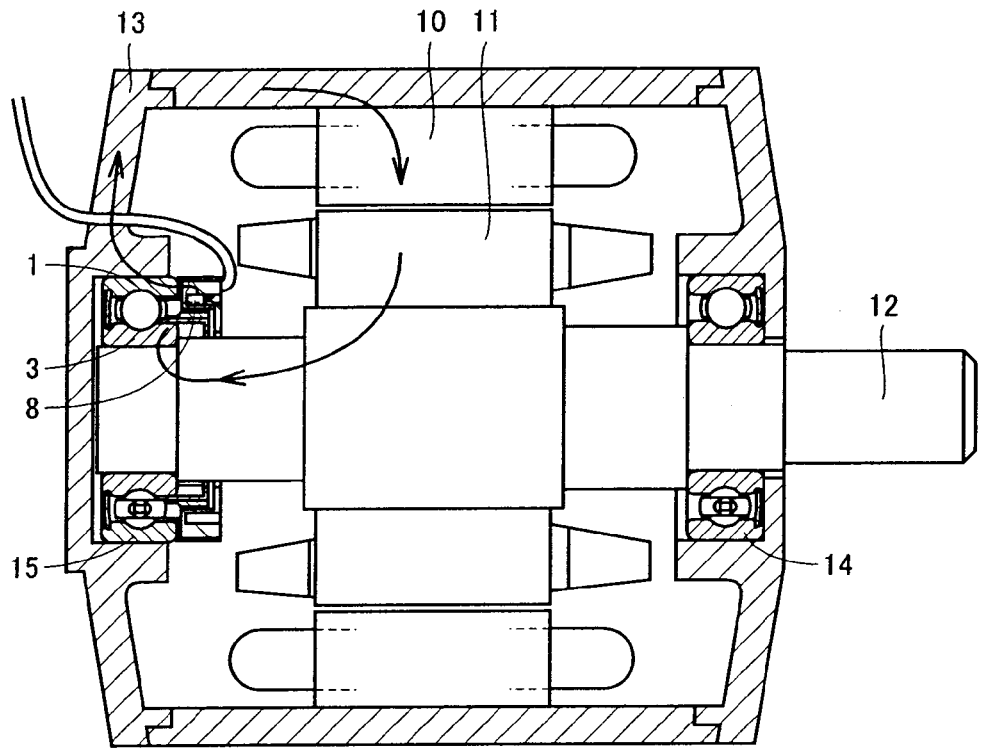
FIG. 27 is a sectional view showing the structure of a motor into which the bearing 500 provided with a rotation sensor is assembled.

In each of bearings 100c and 100d provided with rotation sensors shown in FIGS. 3 and 4, a magnetic body is engaged with a housing (see FIG. 27) with addition of a detent function for the magnetic body. In the bearing 100c provided with a rotation sensor shown in FIG. 3, a magnetic body 16 having a projection on the side of the housing is provided on at least a single portion of a circumference. In the bearing 100d provided with a rotation sensor shown in FIG. 4, a magnetic body 9a is provided with a pin 17 driven into the housing.

Each of the bearings 100c and 100d provided with rotation sensors having the aforementioned structures can attain a function/effect similar to that of the aforementioned bearing 100a provided with a rotation sensor. When the detent function for the magnetic body is added, a connector can be prevented from stress.

While the inner ring 3 is employed as a rotating bearing ring and the outer ring 1 is employed as a fixed bearing ring in each of the aforementioned bearings 100a to 100d provided with rotation sensors, the inner ring 3 and the outer ring 1 may alternatively be employed as a fixed bearing ring and a rotating bearing ring respectively.

Second Embodiment

The structure of a bearing 200a provided with a rotation sensor according to a second embodiment of the present invention is now described with reference to the drawings.

Structure of Bearing Provided with Rotation Sensor

Figure 28:
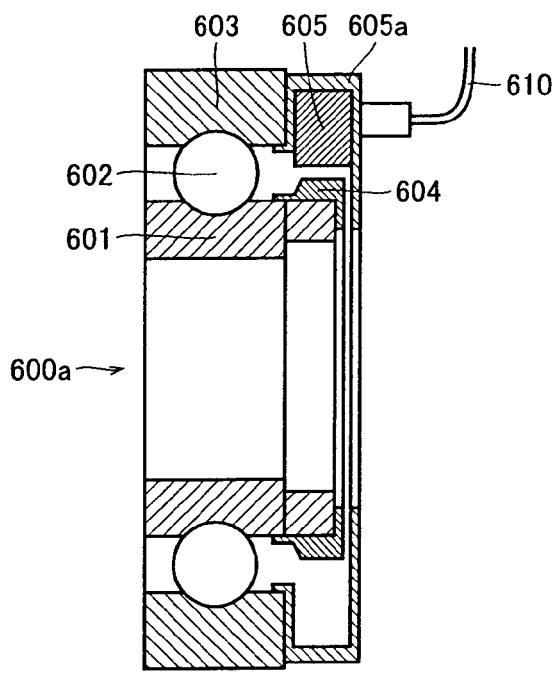
FIG. 28 is a longitudinal sectional view showing a bearing 600a provided with a rotation sensor according to second prior art.
Figure 29:
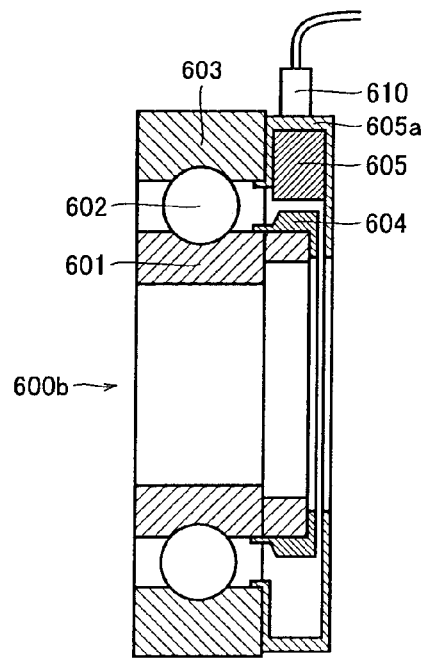
FIG. 29 is a longitudinal sectional view showing another bearing 600b provided with a rotation sensor according to the second prior art.

The basic structure of the bearing 200a provided with a rotation sensor according to this embodiment is similar to that of the conventional bearing 600a provided with a rotation sensor shown in FIG. 28. Therefore, parts of the former identical or corresponding to those of the latter are denoted by the same reference numerals, and redundant description is not repeated.

With reference to FIGS. 5 to 8, the structure of the bearing 200a provided with a rotation sensor according to this embodiment is described.

In the bearing 200a provided with a rotation sensor according to this embodiment, an encoder ring 604 serving as a sensor target is fixed to an inner ring 601 employed as a rotating element and a rotation detecting sensor 605 detecting rotation of the encoder ring 604 is fixed to an outer ring 603 employed as a fixed element through a sensor case 605a consisting of an insulating member similarly to the conventional bearings 600a and 600b provided with rotation sensors, for selecting a detection system in response to application.

For example, a magnetic ring subjected to multi-pole magnetization is employed as the encoder ring 604 and a magnetic detection element such as an MR element is employed as the rotation detecting sensor 605. Alternatively, a ring having variable conductivity may be provided along the surface of the inner ring 601 as a sensor target, and an eddy current detection element may be employed as a sensor. Further alternatively, an optical element may be employed as a sensor and a ring having circumferentially variable optical characteristics may be employed as a sensor target, for detecting reflectance and transmittance of projected light.

An output signal of the rotation detecting sensor 605 can be extracted from pad-shaped electric terminals 606 provided on the outer peripheral surface of the sensor case 605a consisting of an insulating member. As shown in a total perspective view of FIG. 6, the plurality of electric terminals 606 are provided on the outer peripheral surface of the sensor case 605a for supplying power and outputting the signal. The electric terminals 606 shown as flat pad terminals in FIG. 6 may be replaced with pin-shaped terminals 607, as in a bearing 200b provided with a rotation sensor shown in FIG. 7. As in a bearing 200c provided with a rotation sensor shown in FIG. 8, further, a race 601a of an inner ring 601 may be extended to an end portion for providing an encoder ring 604 on the race 601a.

Thus, when the bearing 200a, 200b or 200c provided with a rotation sensor is a small-diametral bearing having an outer diameter of not more than 30 mm, the plurality of electric terminals 606 are provided on the outer peripheral surface of the sensor case 605a for transmitting the signal to a housing of a motor or the like on which the bearing 200a, 200b or 200c provided with a rotation sensor is mounted. Therefore, a connection terminal for transmitting the signal must be provided on a position of the housing corresponding to the electric terminals 606.

Connection Structure

Figure 9:
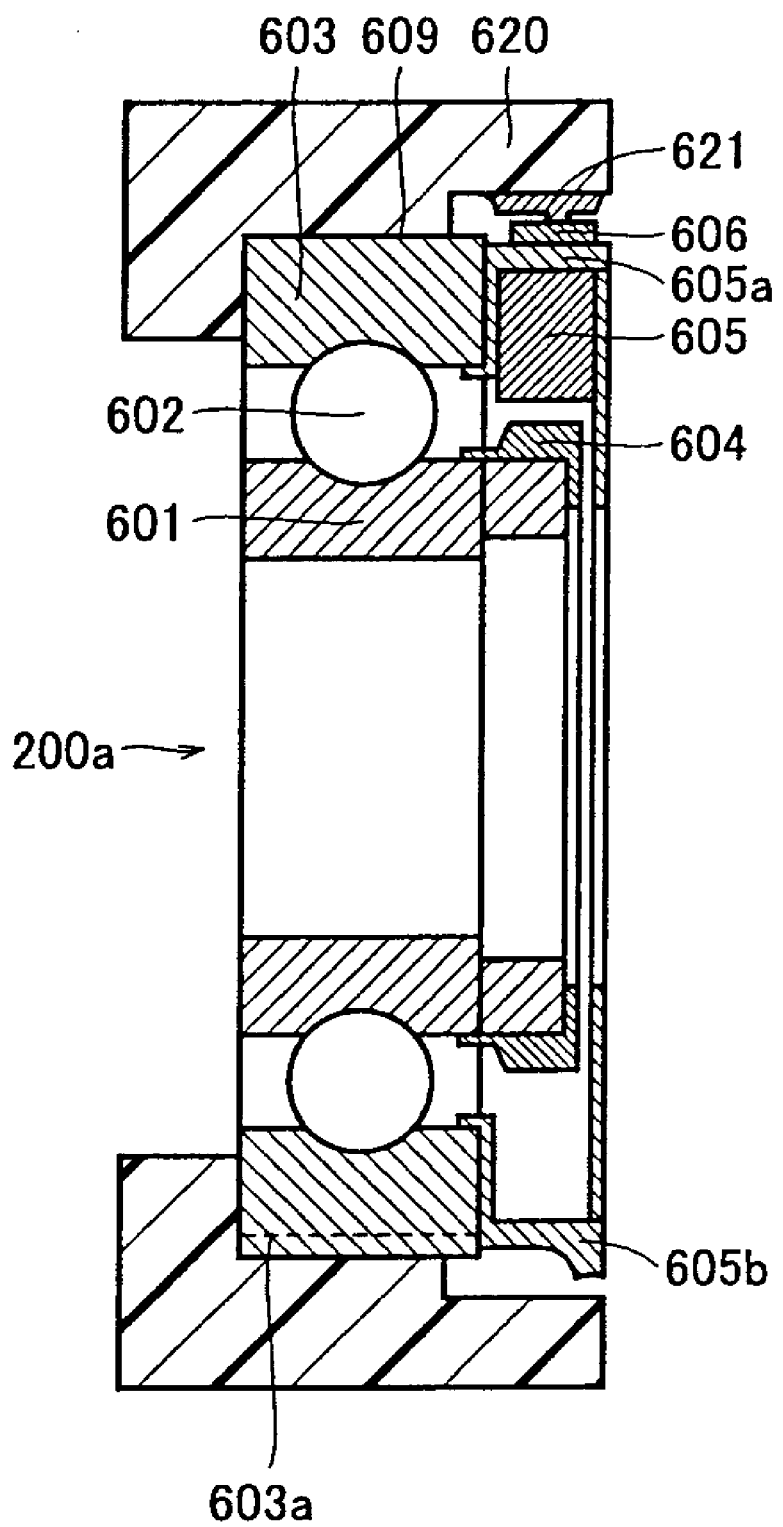
FIG. 9 is a first longitudinal sectional view showing the bearing 200a provided with a rotation sensor assembled into a housing 620.

The connection structure between the aforementioned bearing 200a, 200b or 200c provided with a rotation sensor and the motor is now described with reference to FIG. 9. FIG. 9 is a first longitudinal sectional view showing the bearing 200a provided with a rotation sensor assembled into a housing 620 of the motor.

Figure 13:
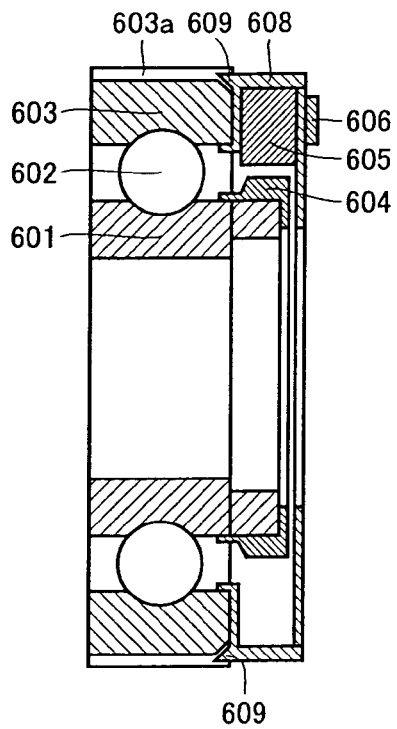
FIG. 13 is a longitudinal sectional view of a bearing provided with a rotation sensor having a keyway.

The housing 620 of the motor is partially provided with a connection terminal 621 coming into contact with the electric terminals 606 of the bearing 600a provided with a rotation sensor. A keyway 603a is provided on the outer peripheral surface of the outer ring 603 as means for positioning the bearing 200a provided with a rotation sensor on the housing 620 along the rotational direction. In this case, a positioning projection 609 shown in FIG. 13 is engaged with the keyway 603a for positioning the outer ring 603 and the sensor case 605a along the rotational direction. Alternatively, a positioning projection 605b or the like may be partially provided on the sensor case 605a.

When the bearing 200a provided with a rotation sensor is assembled into the housing 620 with the positioning means along the rotational direction, the connection terminal 621 of the housing 620 comes into contact with the electric terminals 606 of the bearing 200a provided with a rotation sensor for supplying power to the bearing 200a provided with a rotation sensor so that the output signal can be extracted from the rotation detecting sensor 605.

Figure 10:
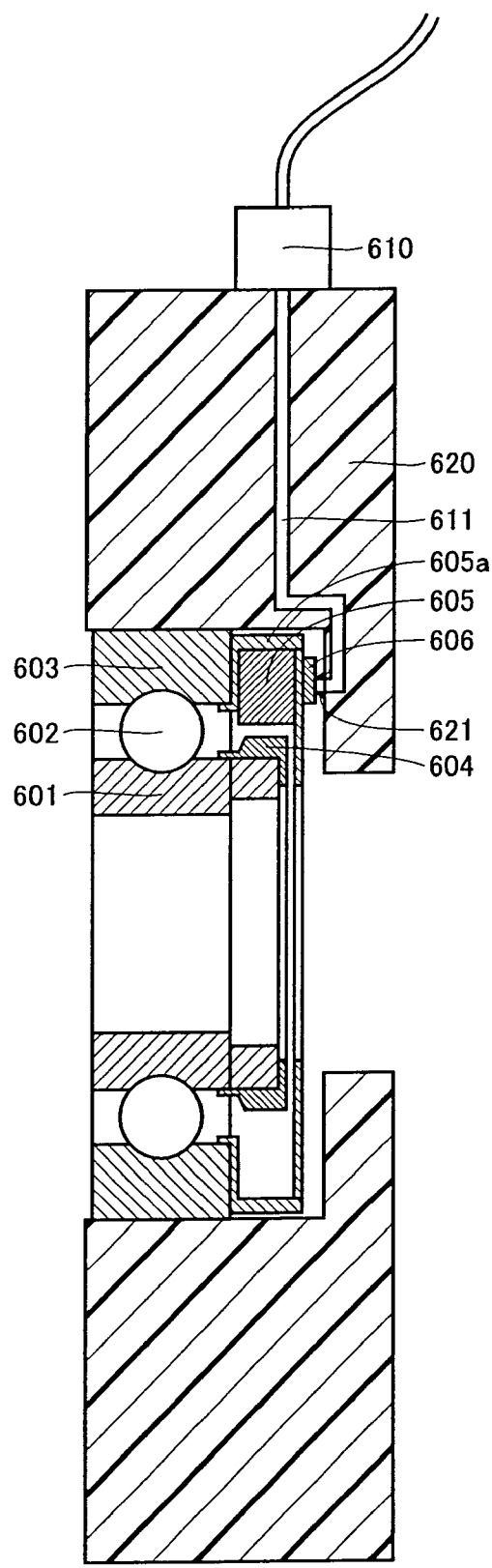
FIG. 10 is a second longitudinal sectional view showing the bearing provided with a rotation sensor assembled into the housing 620.

FIG. 10 shows the case of supplying power to the rotation detecting sensor 605 in practice for extracting the output signal from the rotation detecting sensor 605.

The electric signal output from the electric terminals 606 of the bearing 200a provided with a rotation sensor is guided to an internal wire 611 connected with the connection terminal 621 of the housing 620 and a cable 610 connected with the internal wire 611, and connected to an external device through a connector, a cable or the like.

Figure 11:
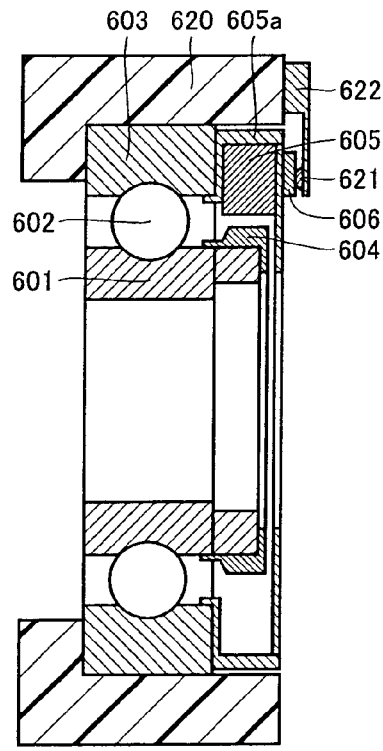
FIG. 11 is a third longitudinal sectional view showing the bearing provided with a rotation sensor assembled into the housing 620.

The position for providing the electric terminals 606 connected with the connection terminal 621 is not restricted to the outer peripheral surface of the outer ring 603 as shown in FIG. 9 but the electric terminals 606 may alternatively be provided on an axial end surface of the outer ring 603, as shown in FIG. 10 or 11.

Figure 12:
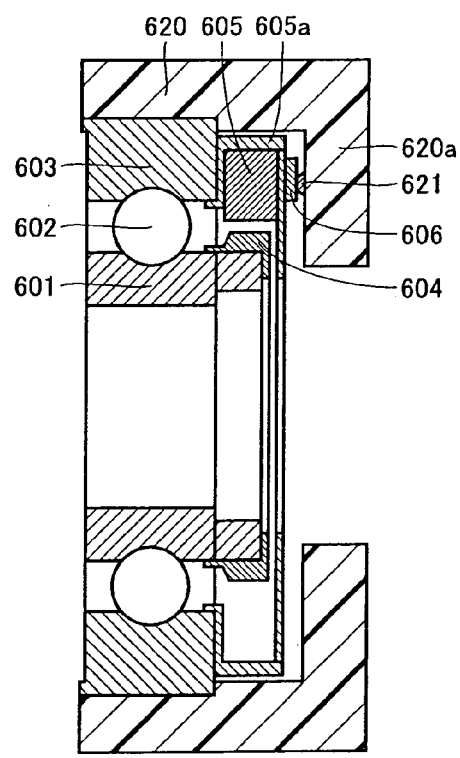
FIG. 12 is a fourth longitudinal sectional view showing the bearing provided with a rotation sensor assembled into the housing 620.

Referring to FIG. 11, the connection terminal 621 is mounted on a connection substrate 622 extending from the housing 620, for pressing the bearing provided with a rotation sensor with the connection terminal 621. Referring to FIG. 12, the connection terminal 621 is provided on an extension part 620a provided on the housing 620 so that the connection terminal 621 comes into contact with the electric terminals 606 when the bearing provided with a rotation sensor is assembled into the housing 620. FIGS. 11 and 12 are third and fourth longitudinal sectional views showing the bearing provided with a rotation sensor assembled into the housing 620.

In order to assemble the bearing provided with a rotation sensor into the housing 620, the connection terminal 621 and the electric terminals 606 must be positioned along the rotational direction. When the keyway 603a is provided on the outer peripheral surface of the outer ring 603 as shown in FIG. 9 or 13, the connection terminal 621 and the electric terminals 606 can be positioned along the rotational direction.

Not only the rotation detecting sensor 605 but also another sensor can also be assembled into the bearing provided with a rotation sensor. For example, a temperature sensor can be arranged in the vicinity of the rotation detecting sensor 605 for detecting the temperature of the bearing provided with a rotation sensor or the rotation detecting sensor 605. Information of the detected temperature is extracted toward the external device through the electric terminals 606 and the connection terminal 621, so that the operating state of the bearing provided with a rotation sensor or the operating environmental temperature of the rotation detecting sensor 605 can be monitored through an external processing unit.

The processing unit predicts or detects failure of the bearing provided with a rotation sensor through the situation of the detected temperature and stops the motor for prompting exchange of the bearing provided with a rotation sensor.

Alternatively, a vibration sensor can also be assembled into the bearing provided with a rotation sensor. When a signal output from the vibration sensor assembled into the bearing provided with a rotation sensor is monitored, abnormal vibration or abnormal sound resulting from damage of the bearing provided with a rotation sensor can be detected. When a load sensor is assembled into the bearing provided with a rotation sensor for monitoring the state of a load applied to rolling elements or a rolling contact surface of the bearing provided with a rotation sensor and predicting failure of the bearing provided with a rotation sensor.

Third Embodiment

Figure 30:
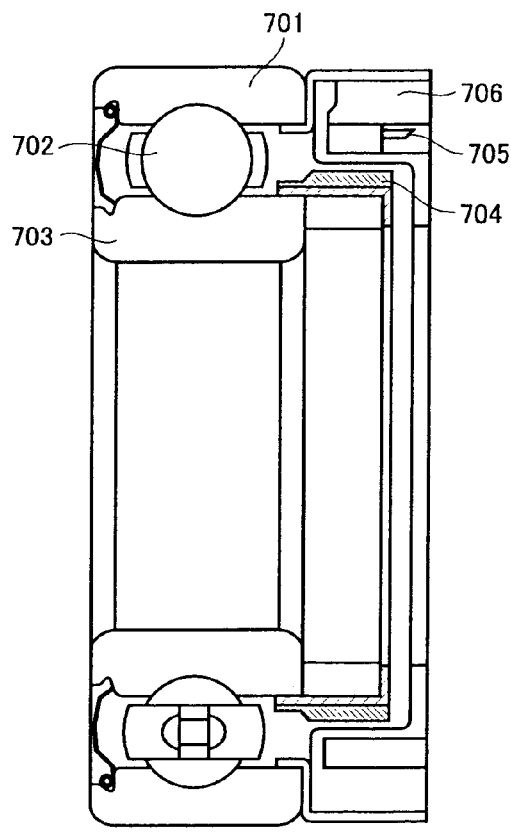
FIG. 30 is a sectional view showing a bearing provided with a rotation sensor according to third prior art.
Figure 31A:
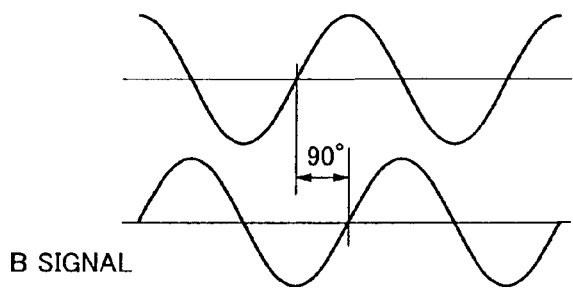
FIGS. 31A and 31B illustrate the waveforms of outputs from a sensor of the bearing provided with a rotation sensor.
Figure 31B:
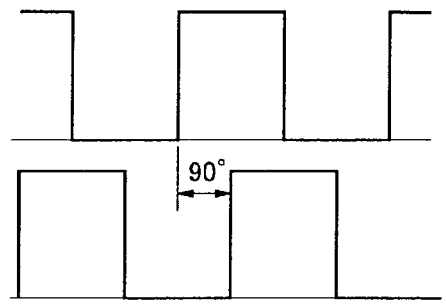

A bearing provided with a rotation sensor according to a third embodiment of the present invention is now described. The basic structure of the bearing provided with a rotation sensor according to this embodiment is similar to that of the conventional bearing provided with a rotation sensor shown in FIG. 30, and hence redundant description is not repeated.

The feature of the bearing provided with a rotation sensor according to this embodiment resides in that a pulser ring is a magnetized encoder consisting of elastomer containing magnetic powder, which is isotropic when the encoder outputs an analog signal and anisotropic when the encoder outputs a rectangular wave signal.

The magnetic powder may have an isotropic magnetization characteristic or an anisotropic magnetization characteristic. The isotropic magnetic powder disadvantageously has low magnetization intensity although the magnetization intensity is uniform in all directions. The anisotropic magnetic powder exhibits high magnetization intensity when oriented in a certain direction, while the magnetization intensity is readily dispersed when not uniformly oriented.

For example, isotropic ferrite powder can be regarded as forming a polycrystalline substance of several $\mu$m in grain size. On the other hand, anisotropic ferrite is in the form of a single-crystalline hexagonal column or plate of about 1 $\mu$m in size.

Figure 14:
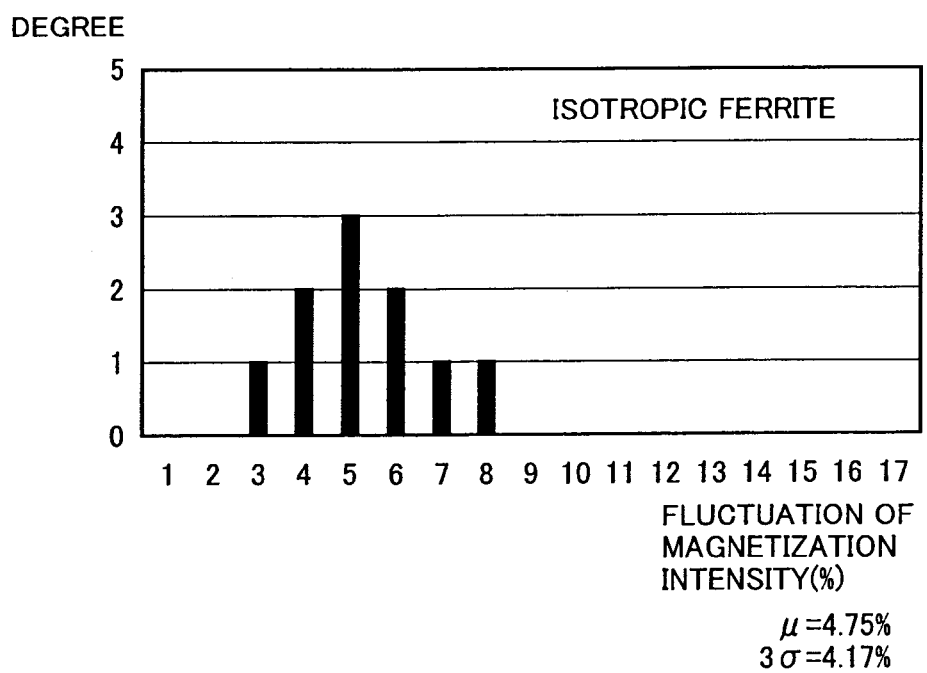
FIG. 14 illustrates results obtained by measuring fluctuation of magnetization intensity of isotropic ferrite in a third embodiment of the present invention.
Figure 15:
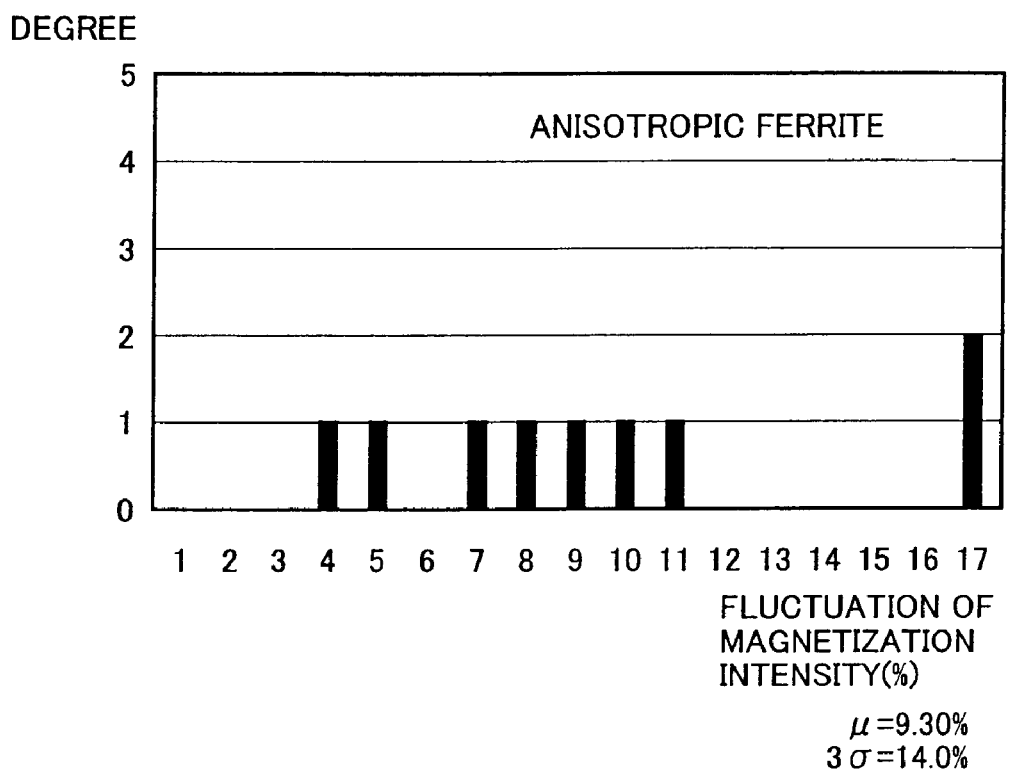
FIG. 15 illustrates results obtained by measuring fluctuation of magnetization intensity of anisotropic ferrite in the third embodiment of the present invention.

FIGS. 14 and 15 illustrate results of measurement of fluctuation of magnetization intensity of isotropic ferrite and anisotropic ferrite employed in the present invention. Comparing FIGS. 14 and 15 with each other, it is clearly understood that fluctuation of magnetization intensity can be substantially halved when employing isotropic ferrite as compared with the case of employing anisotropic ferrite. When employing isotropic ferrite, therefore, fluctuation of an output from the sensor can be reduced.

The magnetization intensity of isotropic ferrite is reduced by about 30% as compared with anisotropic ferrite as shown in Table 1. When a sensor such as an MR element having high sensitivity is employed as a magnetic sensor, isotropic ferrite is preferable since the magnetization intensity may not be the strongest.

TABLE 1

| Magnetization Intensity (mT) | | |
|---|---|---|
| Isotropic ① | Anisotropic ② | Ratio (=①/②) |
| 22.5 | 31.1 | 0.72 |

Fourth Embodiment

Figure 16:
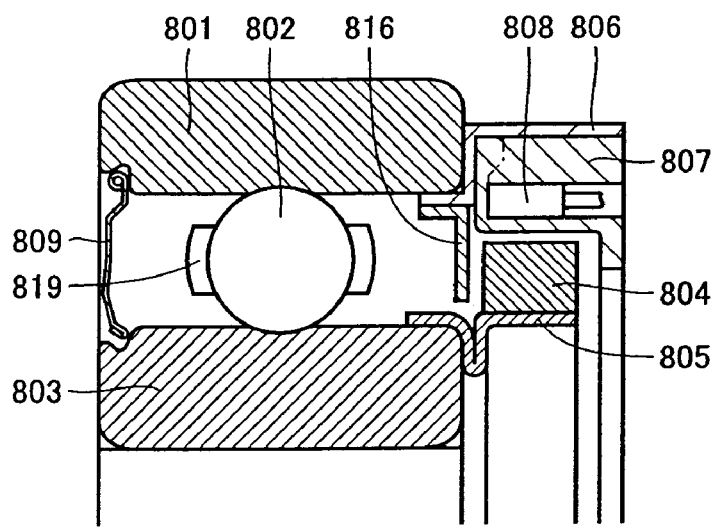
FIG. 16 is a sectional view showing principal parts of an outer ring, an inner ring and rolling elements of a bearing provided with a rotation sensor according to a fourth embodiment of the present invention.
Figure 32:
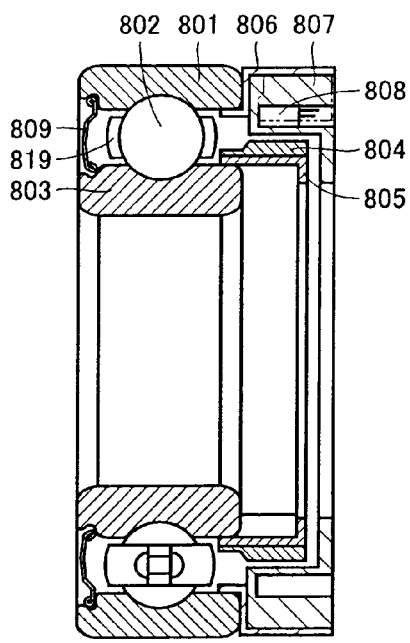
FIG. 32 is a longitudinal sectional view of a bearing provided with a rotation sensor according to fourth prior art.

A bearing provided with a rotation sensor according to a fourth embodiment of the present invention is now described. FIG. 16, showing the bearing provided with a rotation sensor according to the fourth embodiment, corresponds to a view illustrating the outer ring 801, the inner ring 803 and the rolling elements 802 shown in FIG. 32 in an enlarged manner. The bearing provided with a rotation sensor according to the embodiment shown in FIG. 16 is also formed by an outer ring 801, an inner ring 803 and rolling elements 802. A magnetic bypass 816 consisting of a magnetic substance is engaged with the inner diametral surface of the outer ring 801 so that the forward end thereof defines a gap of about 0.5 mm with respect to the outer diameter of a mandrel 805 of a pulser ring 804 press-fitted with the inner ring 803.

When the aforementioned magnetic bypass 816 is arranged, a magnetic flux from the outer ring 801 toward the inner ring 803, i.e., a leakage flux from a motor or the like flows through the magnetic bypass 816 having the minimum magnetic resistance and can be inhibited from influencing a magnetic sensor 808 and the pulser ring 804.

When a sealing function (not shown) is added to the forward end of the magnetic bypass 816, a lubricant such as grease can be sealed for preventing contamination with dust. When a sealing material contains a magnetic material, magnetic resistance is further reduced.

When the magnetic bypass 816 is arranged as close as possible to the pulser ring 804, the external leakage flux flows through the magnetic bypass 816 rather than passing through the magnetic sensor 808 or the pulser ring 804, and influence of the external leakage flux exerted on an output of the magnetic sensor 808 is reduced as a result.

Figure 17:
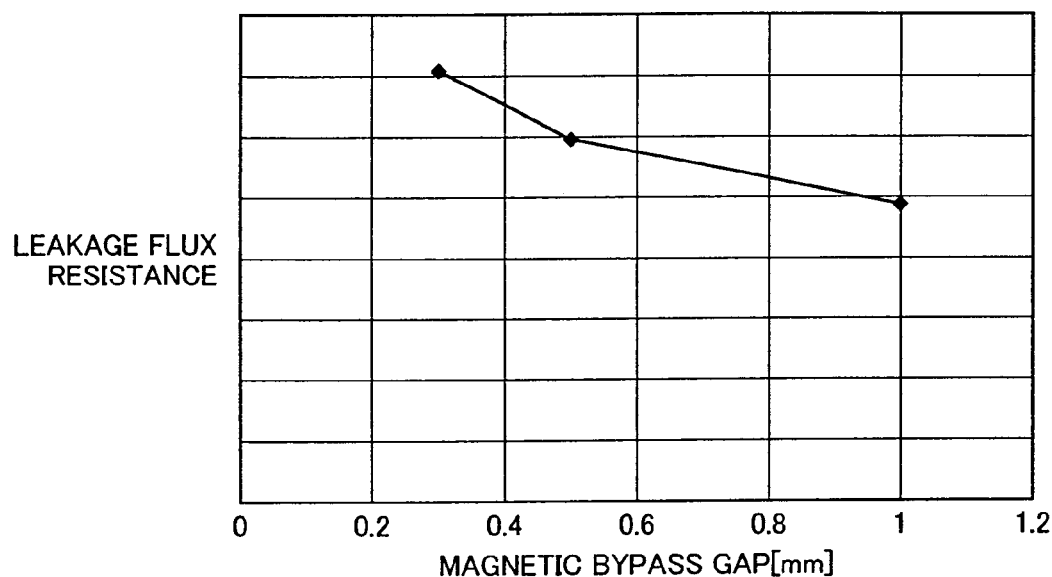
FIG. 17 illustrates a magnetic bypass gap and leakage flux resistance in the embodiment shown in FIG. 16.

FIG. 17 shows the relation between the gap shown in FIG. 16 and leakage flux resistance of the magnetic sensor 808 obtained by field analysis. It is understood from FIG. 17 that influence exerted on the magnetic sensor 808 is reduced as the gap between the magnetic bypass 816 and the mandrel 805 of the pulser ring 804 is reduced. It has been proven that contribution to the leakage flux resistance is increased when the gap is not more than 0.5 mm in particular.

In general, the pulser ring 804 is formed by a magnetized encoder subjected to multi-pole magnetization on the circumference of a rubber magnet or a plastic magnet, and the magnetic sensor 808 is formed by a Hall sensor or an MR sensor.

Figure 18:
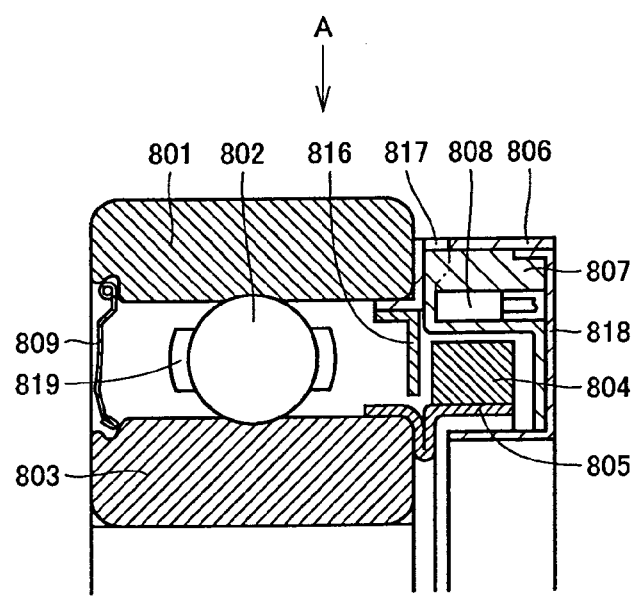
FIG. 18 is a sectional view showing principal parts of an outer ring, an inner ring and rolling elements of a bearing provided with a rotation sensor according to a modification of the fourth embodiment.
Figure 19:
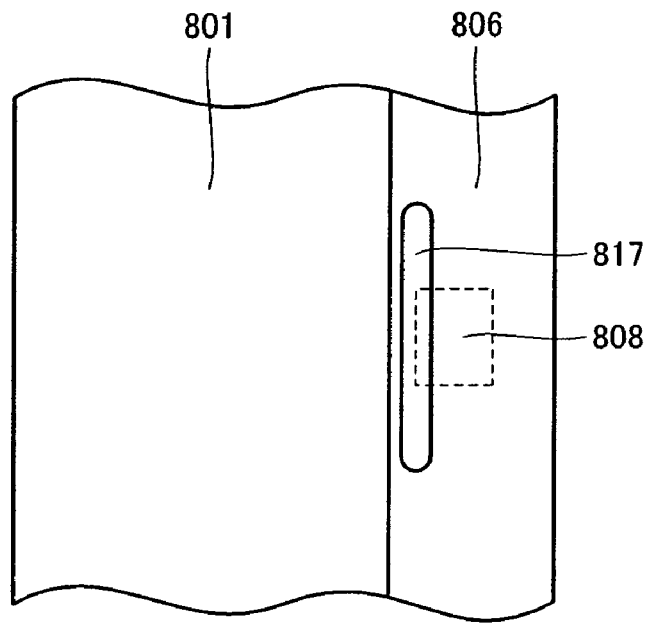
FIG. 19 illustrates the modification shown in FIG. 18 as viewed along arrow A.

FIG. 18 is a sectional view showing a modification of the fourth embodiment of the present invention further improved in leakage flux resistance, and FIG. 19 illustrates the modification as viewed along arrow A in FIG. 18. In the modification shown in FIGS. 18 and 19, an improvement is added to the fourth embodiment in addition to the magnetic bypass 816. As shown in FIG. 19, a notched window 817 is provided on a sensor case fixing ring 806 covering a sensor case 807 above a magnetic sensor 808 for cutting off a loop of a leakage flux leaking toward the magnetic sensor 808. The notched window 817 is provided as close as possible to an outer ring 801, for attaining an excellent effect.

Figure 20:
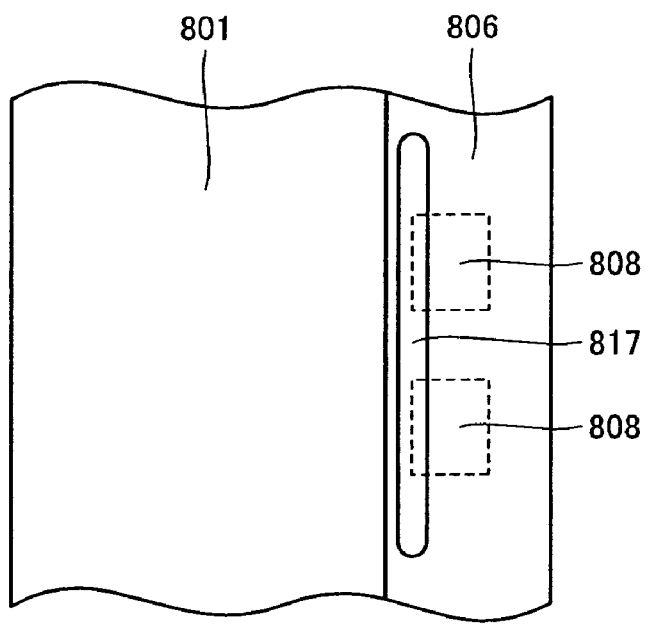
FIG. 20 illustrates two magnetic sensors arranged on the modification shown in FIG. 19.

FIG. 20 illustrates another modification of the fourth embodiment as viewed along arrow A in FIG. 18. In the modification shown in FIG. 20, two magnetic sensors 808 are arranged adjacently to each other. In this case, a long notched window 817 is preferably provided.

The feature of this modification resides in that a side plate 818 consisting of a magnetic substance is provided to form a magnetic path from the sensor case fixing ring 806 shown in FIG. 18 toward an inner ring 803, for improving leakage flux resistance.

Figure 21:
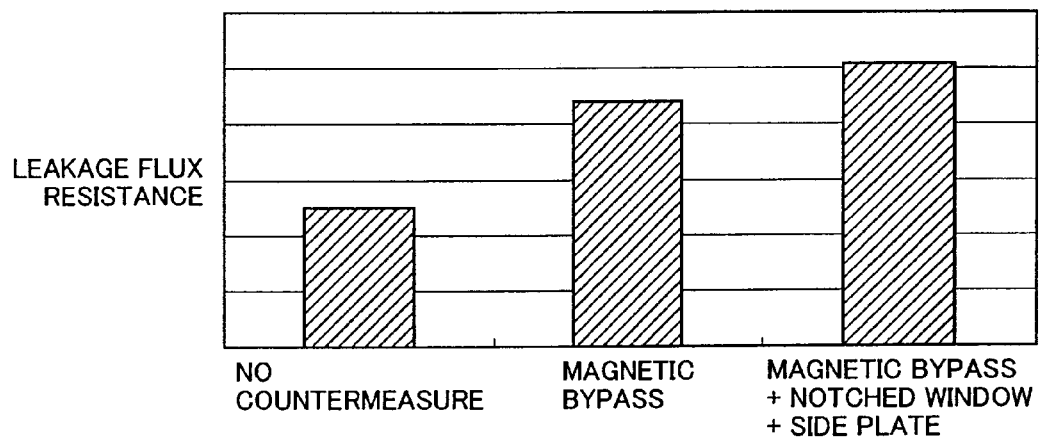
FIG. 21 illustrates leakage flux resistance of a sample provided with no countermeasure, a sample provided with a magnetic bypass and a sample provided with a magnetic bypass, a notched window and a side plate.

FIG. 21 shows effects of the modifications shown in FIGS. 18 to 20 confirmed by an experiment. In each of bearings provided with rotation sensors employed for this experiment, a direct current was fed to a coil concentrically wound on a shaft in place of the motor coil shown in FIG. 33 for evaluating leakage flux resistance through the product (magnetomotive force) of a current value causing a malfunction of a sensor output and the number of turns of the coil. It is clearly understood from FIG. 21 that the bearing provided with a rotation sensor having the magnetic bypass 816, the notched window 817 and the side plate 818 is most excellent in leakage flux resistance.

Figure 22:
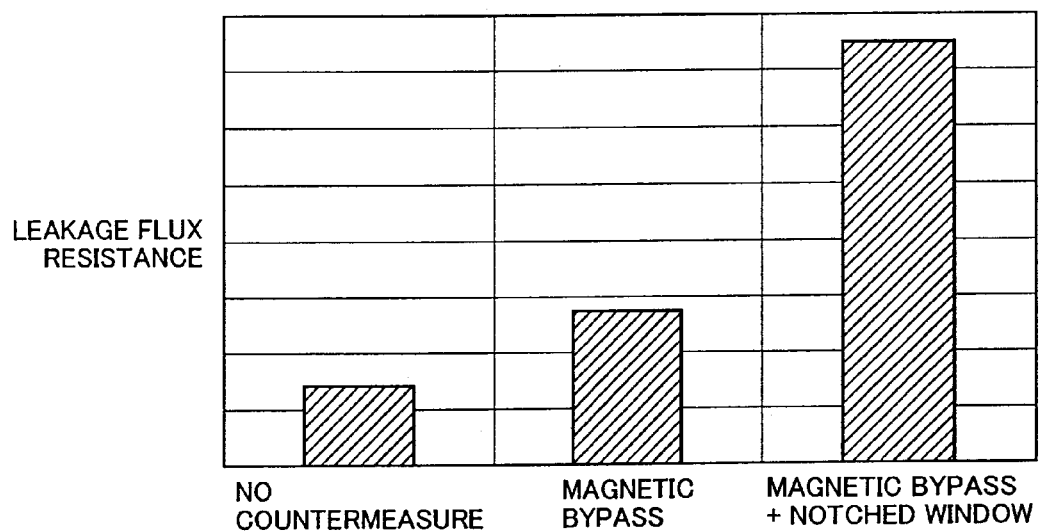
FIG. 22 illustrates results of analysis showing contribution of a notched window on leakage flux resistance.

FIG. 22 illustrates results of analysis showing contribution of the notched window 817 shown in FIG. 19 or 20 on leakage flux resistance. All samples of bearings provided with rotation sensors shown in FIG. 22 were provided with side plates 818. It is clearly understood from FIG. 22 that leakage flux resistance is further improved when the notched window 817 is provided in addition to the magnetic bypass 816.

FIGS. 23A and 23B illustrate Y-directional magnetic flux distributions obtained by field analysis. In each of FIGS. 23A and 23B, a magnetized rubber encoder is employed as a pulser ring 804, and a Hall sensor is employed as a magnetic sensor 808. The result of the analysis shows field change around the magnetic sensor 808 subjected to a leakage flux opposite to the direction of magnetization of the encoder.

FIG. 23A shows results of analysis of a sample provided with the magnetic bypass 816, the notched window 817 and the side plate 818. Referring to FIG. 23A, areas A1 show magnetic fields having magnetic fluxes directed downward (magnetic field strength is increased as the space between lines is reduced), areas A2 how magnetic fields having magnetic fluxes directed upward (magnetic field strength is increased as the density of dots is increased) and areas A3 have no magnetic fields. It is understood from FIG. 23A that the magnetic flux on the pulser ring 804 is not crushed by a leakage flux but spreads, and the flux distribution around a magnetic sensor is not influenced by the leakage flux.

FIG. 23B shows results of analysis of a sample provided with only the side plate 818. Illustration of areas A1, A2 and A3 is identical to that for FIG. 23A. It is understood from FIG. 23B that a magnetic flux of the pulser ring 804 (magnetized rubber) is crushed by a leakage flux and a magnetic field opposite to that of the pulser ring 804 (magnetized rubber) spreads toward a sensor.

Figure 24A:
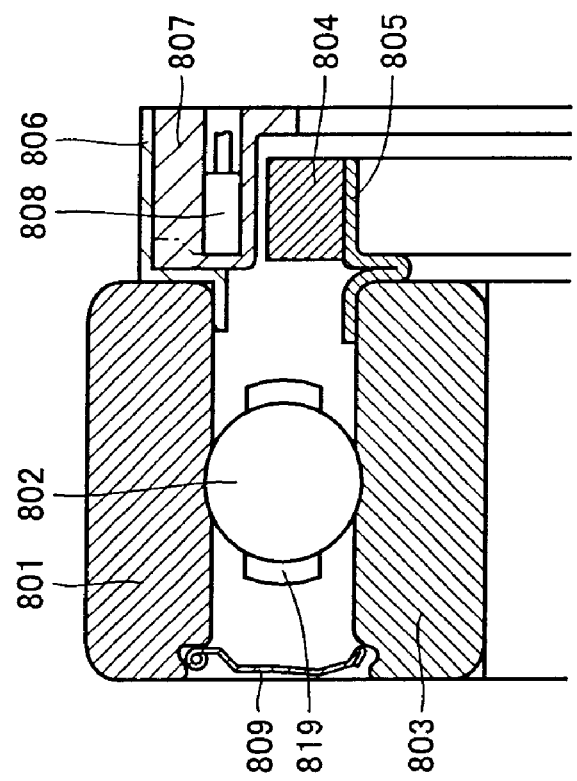
FIGS. 24A and 24B comparatively illustrate effects of rubber thicknesses of magnetized rubber encoders employed as pulser rings.
Figure 24B:
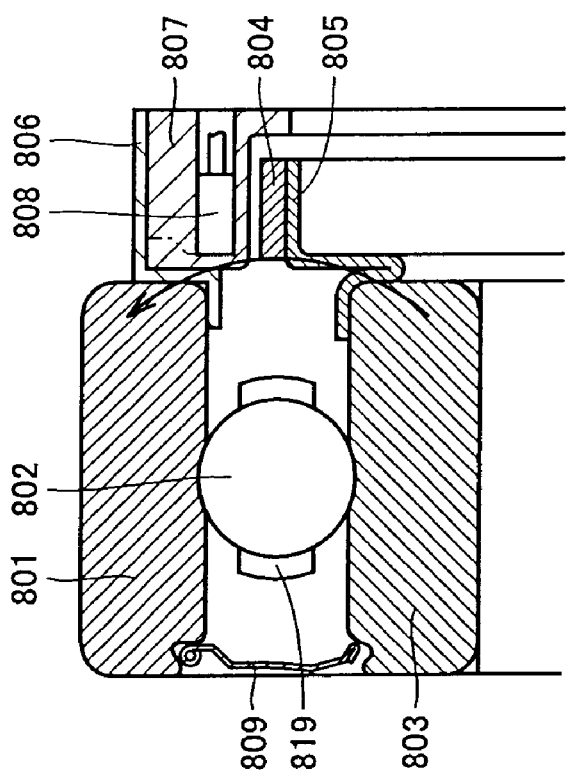

FIGS. 24A and 24B comparatively show effects of thicknesses of rubber of pulser rings 804 formed by magnetized rubber encoders consisting of elastomer containing magnetic powder. The sample shown in FIG. 24A has a small thickness of rubber, and that shown in FIG. 24B has a large thickness of rubber. In general, sufficient magnetization intensity is attained when the thickness of rubber is about 1 mm, and the magnetization intensity is not increased but saturated when the thickness of rubber exceeds a certain range. In the sample having a small thickness of rubber shown in FIG. 24A, however, the distance between the mandrel 805 of the pulser ring 804 and the outer ring 801 is so small that a leakage flux readily passes through the mandrel 805 and the pulser ring 804 toward the outer ring 801 as shown by arrow. When the thickness of rubber is increased as shown in FIG. 24B, the distance between the mandrel 805 and the outer ring 801 is increased for reducing influence exerted by a leakage flux on the pulser ring 804.

Figure 25:
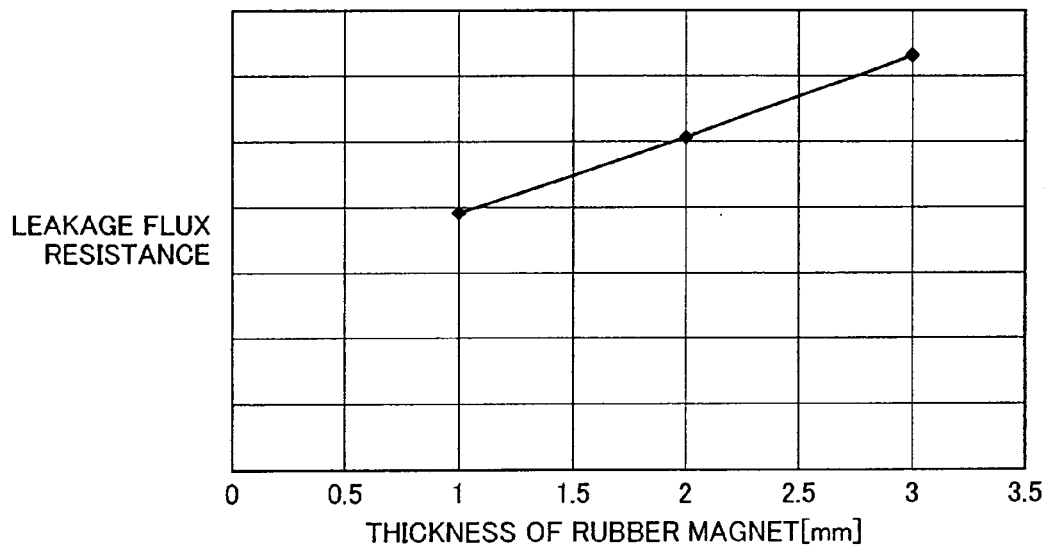
FIG. 25 illustrates a result of field analysis of leakage flux resistance performed by varying a rubber thickness on the basis of the models shown in FIGS. 24A and 24B.

FIG. 25 shows a result of field analysis of leakage flux resistance performed by varying the thickness of rubber on the basis of the models shown in FIGS. 24A and 24B. It is comprehensible from the result shown in FIG. 25 that leakage flux resistance is improved as the thickness of rubber is increased regardless of magnetization intensity. The thickness of rubber, increasing magnetic resistance of the outer ring 801 and the mandrel 805, is sufficient when the same is at least 2 mm.

While the magnetic bypass 816 is engaged with the outer ring 801, a similar effect can be attained by engaging the magnetic bypass 816 with the inner ring 803 when the outer ring 801 is employed as a rotating bearing ring.

Figure 33:
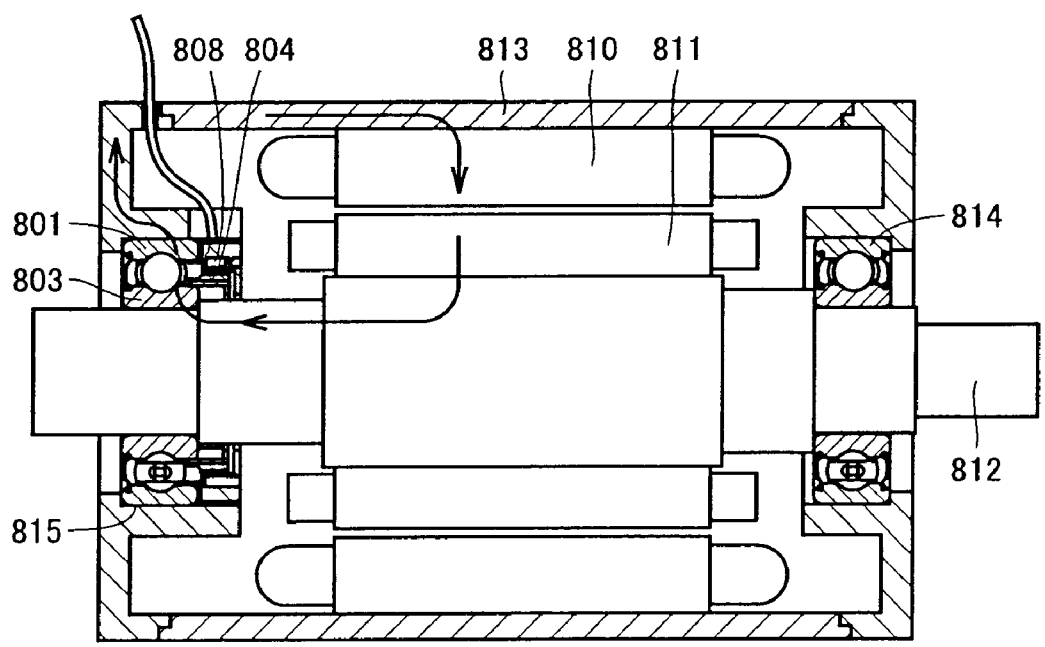
FIG. 33 is a sectional view showing a motor to which the bearing provided with a rotation sensor shown in FIG. 32 is applied.

When the bearing provided with a rotation sensor according to each of the aforementioned embodiments is employed as the rear bearing 815 of the motor shown in FIG. 33, influence exerted on the sensor by a leakage flux from the motor rotor 811 can be reduced for reducing a malfunction.

In the bearing provided with a rotation sensor according to the first aspect of the present invention, a leakage flux generated in a motor can be inhibited from exerting influence on a magnetic sensor by providing means reducing magnetic resistance between the inner ring and the outer ring on an area opposite to a magnetic sensor area. Further, a stable rotation pulse signal can be obtained since no bad influence is exerted on the magnetic sensor.

In the bearing provided with a rotation sensor according to the second aspect of the present invention, the electric terminals for outputting a signal from the rotation sensor is provided on the outer peripheral surface or the axial end surface of the outer ring so that no cable for outputting the signal of the rotation sensor may be directly extracted from the bearing provided with a rotation sensor.

Consequently, the bearing provided with a rotation sensor can be miniaturized and a space for assembling the bearing provided with a rotation sensor into a housing of a motor or the like can be reduced. Further, the bearing provided with a rotation sensor is connected with an external device through a connector or a cable provided on the housing of the motor or the like, whereby the bearing provided with a rotation sensor can be readily exchanged.

In addition, the bearing provided with a rotation sensor can be mounted on the housing by positioning the outer ring thereof along the rotational direction and the axial direction, whereby the external terminals may be small-sized and the bearing provided with a rotation sensor can be further miniaturized.

In the bearing provided with a rotation sensor according to the third aspect of the present invention, either the inner ring or the outer ring forms a rotating bearing ring and the remaining ring forms a fixed bearing ring, the bearing provided with a rotation sensor includes the pulser ring mounted on an end of the rotation bearing ring and the sensor mounted on the fixed bearing ring in opposition to the pulser ring, the pulser ring is a magnetized encoder consisting of elastomer containing magnetic powder, and isotropic powder is employed as the magnetic powder when the sensor outputs an analog signal, whereby dispersion of magnetization intensity can be reduced. Thus, dispersion of the amplitude of the output from the sensor can also be reduced.

When an MR element having high sensitivity is employed for the sensor output, this is more preferable since small magnetization intensity is not disadvantageous. When the sensor outputs a rectangular wave signal, magnetization intensity can be improved by employing anisotropic magnetic powder.

In the bearing provided with a rotation sensor according to the fourth aspect of the present invention, the magnetic ring for forming a magnetic path is provided between the rolling elements and the sensor in the annular space between the inner ring and the outer ring, whereby influence exerted by a leakage flux on the magnetic sensor or the pulser ring can be minimized, and the sensor can be prevented from disturbance of the waveform of the output thereof or a malfunction, to be resistant against an external leakage flux.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing provided with a rotation sensor comprising an inner ring, an outer ring and a plurality of rolling elements stored between said inner ring and said outer ring and storing a sensor detecting the rotational speed of a rotor so that one of said inner ring and said outer ring forms a rotating bearing ring and the other one of said inner ring and said outer ring forms a fixed bearing ring, further comprising:

a pulser ring mounted on an end of said rotating bearing ring;

a sensor mounted on said fixed bearing ring in opposition to said pulser ring, wherein the sensor and the pulsar ring are arranged along the radial direction of the outer ring and the inner ring; and a magnetic bypass ring consisting of a magnetic substance arranged between said rolling elements and said sensor in an annular space defined between said inner ring and said outer ring for forming a magnetic path.

2. The bearing provided with a rotation sensor according to claim 1, wherein an air gap between said magnetic bypass ring and said rotating bearing ring is not more than 0.5 mm.

3. The bearing provided with a rotation sensor according to claim 1, further comprising:

a sensor case holding said sensor, a sensor case fixing ring fixing said sensor case, and a mandrel holding said pulser ring, wherein said sensor case fixing ring and said mandrel are formed by magnetic members.

4. The bearing provided with a rotation sensor according to claim 1, provided with a magnetic bypass reducing magnetic resistance between said sensor case fixing ring and said rotating bearing ring.

5. The bearing provided with a rotation sensor according to claim 1, wherein said sensor case fixing ring is formed with a slit on the side of said fixed bearing ring on which said sensor case fixing ring is mounted and in the vicinity of said sensor.

6. The bearing provided with a rotation sensor according to claim 1, wherein said pulser ring is formed by a magnetized encoder consisting of elastomer containing magnetic powder.

7. The bearing provided with a rotation sensor according to claim 6, wherein the thickness of said elastomer in said magnetized encoder is at least 2 mm.

8. A motor comprising a housing, a stator fixed to said housing and a rotor opposed to said stator and fixed to a rotary shaft and employing the bearing provided with a rotation sensor according to claim 1.

* * * * *